3,000,880
PRODUCTION OF EPSILON CAPROLACTAMS
Benjamin Phillips, Charleston, Samuel W. Tinsley, South Charleston, and Paul S. Starcher, Charleston, W. Va., assignors to Union Carbide Corporation, a corporation of New York
No Drawing. Filed June 8, 1959, Ser. No. 818,545
5 Claims. (Cl. 260—239.3)

This invention relates to a process for the production of epsilon caprolactams. More particularly, this invention is directed to a non-catalytic process for the production of epsilon-caprolactams by the reaction of epsilon-caprolactone with aqueous ammonia or aqueous primary amines at high pressures and at temperatures above the critical temperature of water and ammonia. More specifically it is an object of this invention to provide a one-step process for the production of epsilon-caprolactoms.

A particular object of this invention is to provide a process for the production of epsilon-caprolactams to the substantial exclusion of polymerized material and in high yield efficiencies of epsilon-caprolactone to epsilon-caprolactams. It is another object of this invention to provide a one-step process for the production of N-alkyl substituted epsilon-caprolactams. A further object is to provide a continuous process for the production of epsilon-caprolactam and N-alkyl-epsilon-caprolactams. These and other objects will become readily apparent to those skilled in the art in light of the teachings herein set forth.

Lactams are used for the production of polyamides suitable for the manufacture of fabrics, films, fibers, coating compositions and the like. Heretofore, the usual preparation of lactams has been by the Beckmann rearrangement of ketoximes. Caprolactam, the most important member of this class, has long been prepared by rearrangement of cyclohexanone oxime. However, it has been necessary to prepare cyclohexanone oxime intermediate by means of one or more reactions. For example, the preparation of the oxime by treating nitrocyclohexane or its salt with hydroxylamine, hydrogen, sulfur, sodium nitrite and the like is well known in the art. It is also known to prepare cyclohexanone oxime by treatment of cyclohexanone-bisulfite complexes with nitrous acid and like processes. Although such multistep processes for the preparation of lactams have generally produced satisfactory products, the most desirable process is one whereby lactams could be prepared in a single and inexpensive reaction. The invention provides a new and inexpensive, non-catalytic method of producing epsilon-caprolactams by using inexpensive raw materials with the use of standard equipment.

It is known that butyrolactam can be produced by the reaction of anhydrous ammonia with butyrolactone. However, heating epsilon-caprolactone at 300° C. with anhydrous ammonia produces a polymerized product to the substantial exclusion of the monomeric epsilon-caprolactam.

The present invention is based on the discovery that epsilon-caprolactams are unexpectedly produced in good yields by heating epsilon-caprolactones, water and ammonia above the critical temperature of water and above the critical pressure of water. The maximum yield of monomers of epsilon-caprolactams in this invention approximates 50 percent yield per pass since the process involves a complex mixture of equilibria. However, recycling the reaction products after removal of the formed monomeric epsilon-caprolactams, under the conditions identical to those of the initial reactions, produces yield efficiencies of epsilon-caprolactone to epsilon caprolactams as high as 85 to 95 percent to the substantial exclusion of polymeric products.

The process of this invention is readily accomplished by heating epsilon-caprolactone in a pressure vessel with ammonium hydroxide or an aqueous primary amine solution within the temperature range of Tc to Tc+100° C. preferably within the temperature range of Tc to Tc+50° C. where Tc is the critical temperature of water and at a pressure above the critical pressure of water for a sufficient period of time to produce the corresponding epsilon-caprolactams. The reaction mixture, upon cooling, is subjected to conventional recovery procedures such as extraction with a chloroform solution followed by distillation to recover the epsilon-caprolactams thus produced.

Heating epsilon-caprolactone under the aforementioned conditions with aqueous ammonia or aqueous primary amine produces epsilon-caprolactams having the general formula:

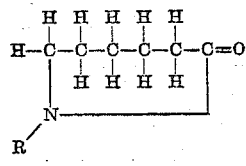

wherein R represents a group selected from the class consisting of hydrogen and lower alkyl groups containing from 1 through 6 carbon atoms.

The compound which reacts with the lactone may be either ammonia or a primary amine. Structurally, ammonia and the primary amines may be represented as follows:

$$R-NH_2$$

wherein R is selected from the class consisting of hydrogen and lower alkyl groups containing from 1 to 6 carbon atoms. Specific compounds which possess this formula include ammonia and the primary amines such as methylamine, ethylamine, propylamine, butylamine, hexylamine, and the like. The concentrations of the nitrogen compound in water are not necessarily critical to this invention but can be used in the range from 2 to 80 percent. The molar ratio of nitrogen compound to epsilon-caprolactone can range from about 1:1 to 20:1, but the preferred range is 2:1 to 10:1.

The time of reaction is not necessarily critical and may vary from 10 minutes to as much as a day depending on the reaction conditions. Most desirably, conditions are adjusted so as to complete the reaction in about one to three hours.

The following examples illustrate and describe processes involving the production of epsilon-caprolactams in accordance with the invention.

EXAMPLE I

Preparation of epsilon-caprolactam

In each of the examples which are summarized in Table I, the lactone and aqueous ammonia are charged to a stainless steel bomb and heated under superatmospheric pressure to the temperature for the time indicated in Table I. After cooling, the reaction mixtures are extracted five times with ¼ volume of chloroform. The chloroform solutions are then distilled to obtain the epsilon-caprolactam. The following results were obtained:

TABLE I

| Temp., °C. | Contact Time, Minutes | Ammonia-Lactone, Molar Ratio | Water-Lactone, Molar Ratio | Ammonia Concentration, Percent | Epsilon-Caprolactam Yield, Percent |
|---|---|---|---|---|---|
| 385 | 19.8 | 5.08 | 26 | 15.5 | 28.4 |
| 388 | 60.2 | 4.98 | 26.1 | 15.5 | 41 |
| 388 | 60.9 | 5.13 | 25.95 | 15.7 | 45.3 |
| 389 | 102.1 | 5.02 | 26 | 15.5 | 49.4 |
| 387 | 60.2 | 5.18 | 25.8 | 16 | 49.8 |
| 400 | 180 | 10 | 24.3 | 28 | 50.5 |
| 430 | 180 | 10 | 24.3 | 28 | 13.5 |
| 470 | 180 | 10 | 24.3 | 28 | 10 |

EXAMPLE II

A mixture of 342 grams of epsilon-caprolactone and 510 grams of anhydrous ammonia is heated in a 3-liter stainless steel bomb for 3 hours at 300° C. The reaction product obtained is a polymerized material to the substantial exclusion of monomeric epsilon-caprolactam.

EXAMPLE III

*Preparation of N-(n-butyl)-epsilon-caprolactam*

A mixture of 85.5 grams of epsilon-caprolactone and 1258 grams of a 26 percent aqueous solution of n-butylamine is charged to a 3-liter stainless steel bomb and heated to 375° C. for 3 hours. The reaction mixture is cooled and extracted with chloroform. Distillation of the chloroform extract gives 80.5 grams of N-(n-butyl)-epsilon-caprolactam (32 percent yield). The following physical properties are observed:

Color—colorless liquid
Boiling point—121° C./5 millimeters
Refractive index—1.4719–22 (n 30/D)

| Analysis | calculated | found |
|---|---|---|
| C, percent | 70.95 | 71.16 |
| H, percent | 11.31 | 11.36 |
| N, percent | 8.28 | 8.42 |

EXAMPLE IV

*Preparation of N-methyl-epsilon-caprolactam*

A mixture of 95 grams of epsilon-caprolactone and 1190 grams of a 22.5 percent aqueous solution of methylamine is charged to a 3-liter stainless steel bomb and heated to 375° C. for 3.25 hours. The reaction mixture is cooled and extracted with chloroform. Distillation of the chloroform solution gives 53 grams of crude N-methyl-epsilon-caprolactam (50 percent yield) boiling at 77–102° C./2 millimeters. Redistillation of the lactam cut gives pure N-methyl-epsilon-caprolactam. The following physical properties are observed.

Boiling point—75° C./1.7 millimeters.
Refractive index—1.4792 (n 30/D)
Percent nitrogen calculated, 11.01; found, 11.02, 10.99.

EXAMPLE V

*Preparation of epsilon-caprolactam*
RECYCLE EXPERIMENTS

Two charges of the following mixture,

| | Grams |
|---|---|
| Epsilon-caprolactone | 114 |
| 28 percent aqueous ammonia | 605 |
| Water | 605 | are made up and each is heated in a 3-liter stainless steel bomb for 3 hours at 390° C. The reaction mixture from each bomb is extracted 7 times with 200-milliliter portions of chloroform. The chloroform layers are combined and distilled to recover epsilon-caprolactam. The water layers are brought up to an ammonia concentration of 14 percent by the addition of 28 percent aqueous ammonia and are recharged to the stainless steel bombs and are heated again for 3 hours. The reaction mixtures are again extracted with chloroform and the water layers recharged with additional ammonia for a third heating period. They are again extracted with chloroform. Distillation of the chloroform layers from each pass gives epsilon-caprolactam in the following yields (based on amount of epsilon-caprolactone remaining in the water layer each time).

1st pass—yield=50.5 percent
2nd pass—yield=37.0 percent
3rd pass—yield=31.5 percent
Overall conversion to epsilon caprolactam 87 percent The water layer is distilled after the third pass. Counting the residues from all distillations and adding all the product produced, the material balance of high boiling materials is 97.9 percent.

It can be seen from Table I that the preferable reaction temperature ranges from about 380° C. to about 415° C. In these temperature ranges, the reaction times of about 60 minutes are preferred to obtain yields higher than 40 percent. Longer reaction times than 60 minutes do not appear to increase the yields appreciably. For the best yields, a molar ratio of ammonium hydroxide to lactone of 3 to 1 is preferable yet a 10 to 1 molar ratio produces good yields as well. The use of ammonium hydroxide concentrations ranging between 14 percent and 28 percent has no significant effect on the yields of caprolactam.

What is claimed is:

1. A process for the production of epsilon-caprolactams characterized by the formula

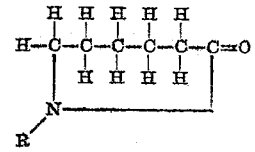

wherein R represents a member of a group selected from the class consisting of hydrogen and lower alkyl groups which comprises heating epsilon-caprolactone with an aqueous solution containing a nitrogen compound characterized by the formula

wherein R represents a member selected from the group of hydrogen and lower alkyl groups within the temperature range of Tc to Tc+100° C. where Tc is the critical temperature of water and at a pressure above the critical pressure of water for a sufficient length of time to produce the corresponding epsilon-caprolactams.

2. The process of claim 1 in which the nitrogen compound is ammonia, producing epsilon-caprolactam.

3. The process of claim 1 in which the nitrogen compound is methylamine, producing N-methyl-epsilon-caprolactam.

4. The process of claim 1 in which the nitrogen compound is n-butyl amine, producing N-(n-butyl)-epsilon-caprolactam.

5. The process of claim 1 in which the temperature range is Tc to Tc+50° C. where Tc is the critical temperature of water.

References Cited in the file of this patent

UNITED STATES PATENTS

| 2,758,991 | Kretzers et al. | Aug. 14, 1956 |
| 2,930,790 | Weise | Mar. 29, 1960 |
| 2,952,675 | Bolle | Sept. 13, 1960 |

OTHER REFERENCES

Spath et al.: Berichte, vol. 69 (1936), pages 2727–31.